(12) United States Patent
Kane (10) Patent No.: US 7,040,859 B2
(45) Date of Patent: May 9, 2006

(54) WIND TURBINE

(76) Inventor: Vic Kane, 1118 NW. 86th Cir., Vancouver, WA (US) 98065

( * ) Notice: Subject to any disclaimer, the term of this patent is extended or adjusted under 35 U.S.C. 154(b) by 130 days.

(21) Appl. No.: 10/772,022

(22) Filed: Feb. 3, 2004

(65) Prior Publication Data

US 2005/0169742 A1   Aug. 4, 2005

(51) Int. Cl.
*F03D 7/06* (2006.01)
(52) U.S. Cl. .................. 415/4.2; 415/4.4; 416/197 A; 416/242
(58) Field of Classification Search .......... 416/DIG. 2, 416/197 A, 197 R, 228, 242, 243; 415/2.1, 415/4.1, 4.2, 4.3, 4.4, 4.5
See application file for complete search history.

(56) References Cited

U.S. PATENT DOCUMENTS

| | | | |
|---|---|---|---|
| 3,970,409 A | * | 7/1976 | Luchuk ...................... 416/145 |
| 5,405,246 A | * | 4/1995 | Goldberg ................ 416/227 A |
| 5,570,859 A | | 11/1996 | Quandt |
| 5,876,181 A | | 3/1999 | Shin |
| 6,030,179 A | | 2/2000 | McCabe |
| 6,069,409 A | | 5/2000 | Fowler et al. |
| 6,327,994 B1 | | 12/2001 | Labrador |
| 6,346,784 B1 | | 2/2002 | Lin |
| 6,448,668 B1 | | 9/2002 | Robitaille |
| 6,465,901 B1 | | 10/2002 | Croes |

OTHER PUBLICATIONS

Kadlec, Characteristics of Future Vertical Axis Wind Turbines, Sandla Report, SAND79-1068, Sandia National Laboratories, Nov. 1982.
Oy Windside Production Ltd., Energy Solution for Extreme Conditions, http://www.windside.com, prior to Oct. 8, 2003, 14 pages, Finland.
C.O.R.E International, Turby, prior to Oct., 2003, 1 page, C.O.R.E International, the Netherlands.
Sulman, Savonious Rotor, The Alternative Windmill, http://www.southcom.au/~windmill, 5 pages, Feb. 25, 2003, Tasmania, Australia.
Danish Wind Energy Association, Wind Power, Org., www.windpower.org, Chapters 1.2 Wind (10 pgs.), Chapter 1.3 Turbine Siting (17 pages), Chapter 1.4 energy Output (11 pages), Chapter 1.7 Turbine Design (5 pages,) Chapter 1.9 R&D (5 pages), May 10, 2003, Denmark.

* cited by examiner

*Primary Examiner*—Edward K. Look
*Assistant Examiner*—Dwayne J White
(74) *Attorney, Agent, or Firm*—Chernoff, Vilhauer, McClung & Stenzel (57) ABSTRACT

A wind turbine operable as either a vertical axis wind turbine or a horizontal axis wind turbine is disclosed.

26 Claims, 5 Drawing Sheets

WIND TURBINE

CROSS-REFERENCE TO RELATED APPLICATIONS

Not applicable.

BACKGROUND OF THE INVENTION

The present invention relates to a wind turbine.

Modern wind turbines are divided into two major categories: horizontal axis turbines and vertical axis turbines. Horizontal axis wind turbines typically comprise a tower and a fan-like rotor mounted at the top of the tower for rotation about an axis substantially parallel to the earth's surface. The rotor of a horizontal axis wind turbine must face either into or away from the direction of the wind and a yaw mechanism is required to rotate the rotor about the vertical axis of the tower to keep the rotor in proper alignment with the wind flow. Since a mechanical means of delivering power to the ground could cause the rotor to yaw out of alignment with the wind, energy conversion devices, such as generators; power transmission equipment; and related equipment are typically also mounted atop the tower. A structurally robust and costly tower is required to support the weight of the elevated equipment. In addition, the tower structure must be resist oscillation and fatigue resulting from pressure pulsations produced by the interaction of the moving rotor blades and the tower. Likewise, the pressure pulse created by the wind shading of the tower causes the blades of the rotor to flex inducing fatigue in the blades and other rotor components. Maintenance of horizontal axis turbines can be complex because the equipment is located at the top of the tower. A large crane is typically required to replace equipment or to support the rotor during bearing replacement or maintenance. While horizontal axis wind turbine installations are relatively complex and expensive, they are the most common wind turbine configurations in current use.

Vertical axis wind turbines comprise, generally, a central shaft arranged vertically with respect to the ground and rotatably supporting a plurality of blades or vanes arrayed around the shaft and roughly perpendicular to the wind flow. Vertical axis turbines do not require a yaw mechanism to align the blades with the wind and the generator or other energy converter and related power transmission equipment may be mounted on the ground at the base of the turbine, potentially substantially reducing the complexity and cost of the installation.

Vertical axis wind turbines are divided generally into lift- and drag-types. Drag-type vertical axis wind turbines, exemplified by the three-cup anemometer and the Savonius wind turbine, are rotated by the force produced by the wind impinging on the exposed area of cups, buckets, or paddles arranged around a vertical shaft. Savonius, U.S. Pat. No. 1,697,574, incorporated herein by reference, discloses a vertical axis wind turbine that can be described as a barrel cut in half lengthwise with the halves offset to form two scoops and mounted on a vertical shaft. The efficiency of a Savonius turbine is limited because power produced by the gathering side of the rotor is offset by drag produced by the other side of the rotor. In addition, since the area of the scoops exposed to the wind flow varies as the turbine rotates, the torque is not even throughout a revolution of the shaft and no torque will be produced to initiate rotation if the rotor is improperly aligned with the wind flow. Further, the maximum velocity of the cups or paddles of a drag-type turbine is substantially equal to the velocity of the wind (tip speed ratio≈1). While this type of turbine can produce high torque and can be useful for pumping water and similar tasks, the speed of rotation is generally too slow for efficient production of electricity, a major use of commercial wind turbines.

Lift-type vertical axis turbines rely on the lift force generated as the wind flows over an air foil to obtain tip speeds exceeding the wind's velocity. Darrieus, U.S. Pat. No. 1,835,018, incorporated herein by reference, discloses a wind turbine typifying lift-type vertical axis wind turbines. The Darrieus wind turbine is the only vertical axis wind turbine ever manufactured commercially in any volume. The Darrieus wind turbine may comprise C-shaped rotor blades attached at their top and bottom ends to a vertical central shaft or rectilinear blades arranged parallel to the shaft in a cylindrical drum or squirrel cage arrangement (sometimes referred to as a "Giromill"). Darrieus turbines typically have two or three blades. Since lift forces provide the torque for rotation, the tip speed of the blades can exceed the speed of the wind. Darrieus wind turbines can have a tip speed ratio exceeding three making this type of turbine suitable for electric power generation.

While vertical axis wind turbine installations are potentially less complex and costly than horizontal axis turbines, the lack of commercial success of vertical axis turbines is indicative of substantial drawbacks of this type of turbine. Since no tower is required, a major cost of a wind turbine installation is eliminated. However, wind speeds close to the ground are very low and turbulent due to boundary layer effects. As a result, the output of a vertical axis turbine, particularly the lower half of the rotor, is limited and the overall efficiency is relatively low. Further, guy wires may be required to stabilize the vertical shaft which may make the turbine impractical in extensively farmed or built-up areas. While the power conversion equipment can be mounted at ground level, a crane is typically required to lift the vertical shaft and blades for bearing replacement or maintenance. In addition, lift-type vertical axis turbines are not self starting, but an electric generator connected into a power grid can be used as a motor to start the turbine.

What is desired, therefore, is a wind turbine combining the lower cost and reduced complexity of a vertical axis wind turbine with the higher efficiency and performance of a horizontal axis wind turbine.

DETAILED DESCRIPTION OF THE INVENTION

Figure 1:
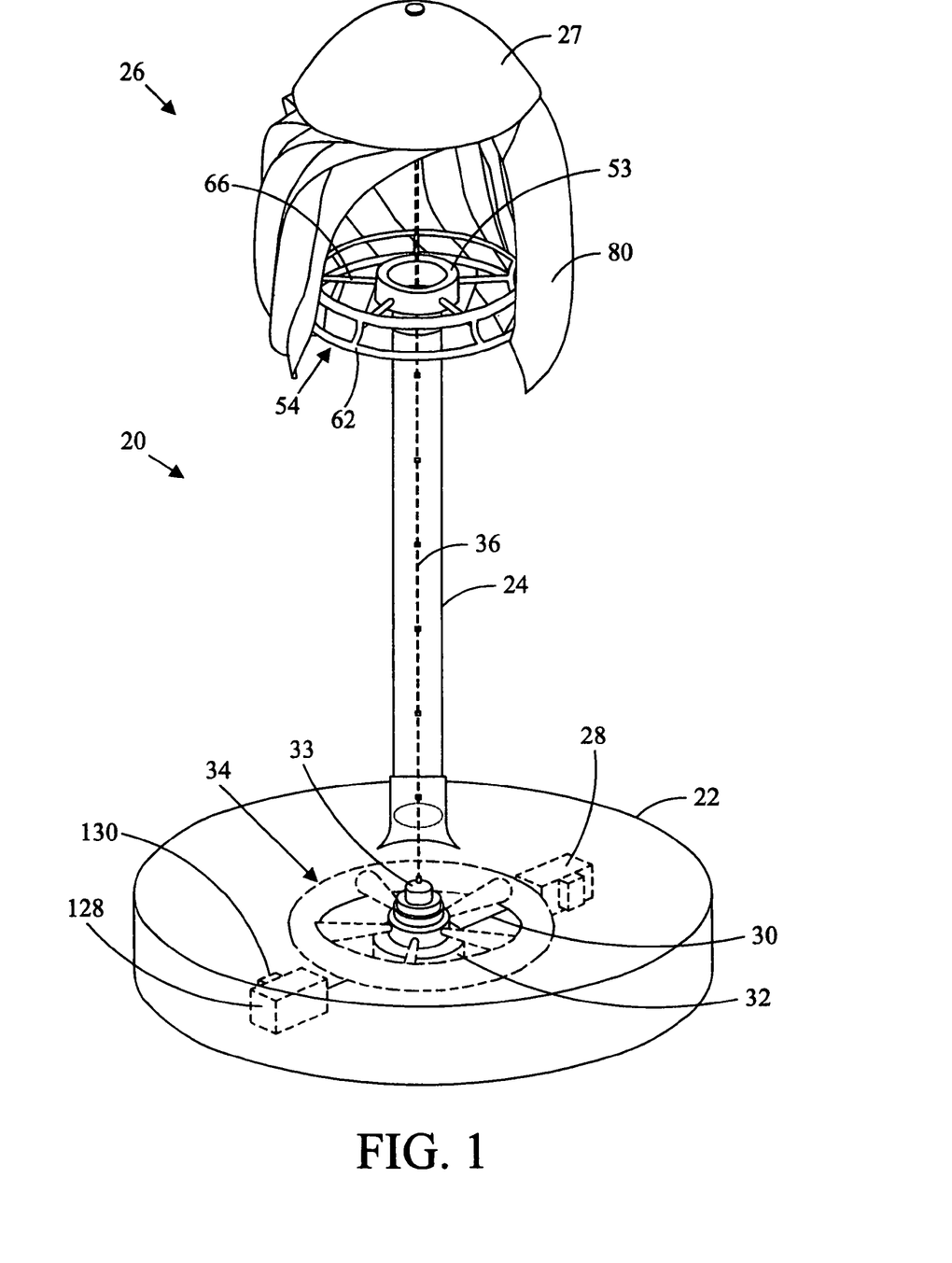
FIG. 1 is a cut-away perspective view of an electric power generation installation incorporating a vertical axis embodiment of the wind turbine.
Figure 2:
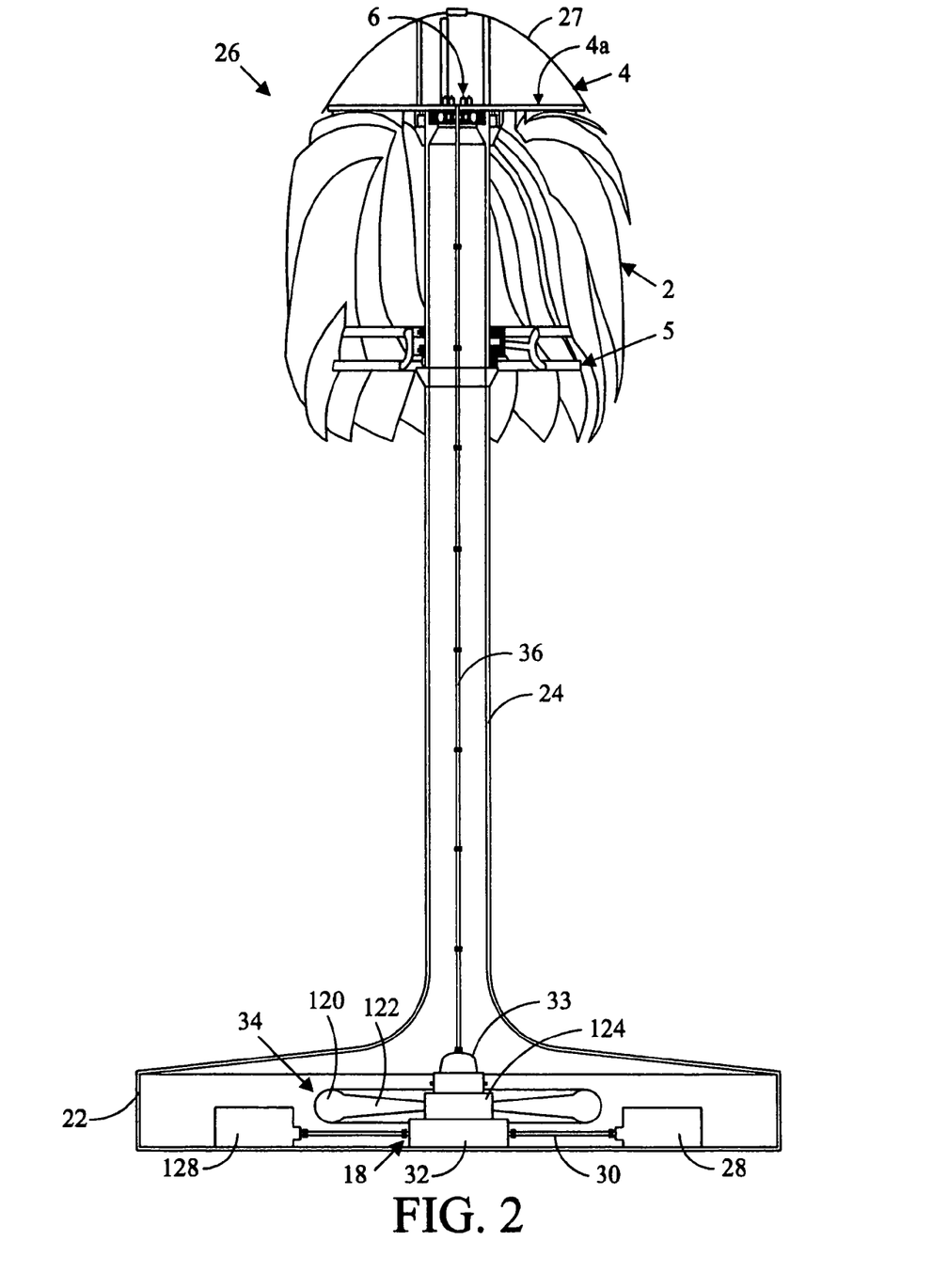
FIG. 2 is a sectional view of the elevation of the electrical power generation installation of FIG. 1.

Referring in detail to the drawings wherein similar parts of the invention are identified by like reference numerals, and, more specifically to FIGS. 1 and 2, a wind power energy converter for generating electricity 20 is illustrative of a vertical axis embodiment of the inventive wind turbine system. The energy converter installation 20 comprises, generally, a foundation or base 22 supporting a tower 24 which, in turn, supports the wind turbine 26. One or more electric power generators 28 are located on the foundation 22 and driven by a flywheel 34. The generators 28 are connected to the flywheel 34 by drive shafts 30 that are connected to a right-angle drive 32 that is rotatably connected to the flywheel. The right angle drive 32 may also include variable ratio gearing or other power transmission components, such as a hydrostatic pump and motor, to control the speed of rotation of the generator 28 under variable wind conditions. A power transmission apparatus rotatably connects the flywheel 34 and the wind turbine 26 at the top of the tower 24. The exemplary power transmission apparatus, as illustrated in FIGS. 1 and 2, includes a clutch 33 to selectively connect the flywheel 34 to a main drive shaft 36 that is connected to and rotated by the wind turbine 26. However, other known power transmission apparatuses could be used to transfer power from the wind turbine 26 to the flywheel 34. For example, a hydraulic pump connected to be driven by the wind turbine 26 could supply pressurized fluid to drive a hydraulic motor connected to rotate the flywheel 34. While the illustrated energy converter installation 20 incorporates electrical generators, pumps or other energy conversion devices attached to the flywheel could be used to convert the rotational energy of the wind turbine to an elevated fluid or another form of energy. Likewise, the energy converter installation 20 includes a right angle drive 32, but the generator 28, other energy conversion devices, and power transmission devices could be mounted in-line with the main drive shaft 36.

Figure 3:
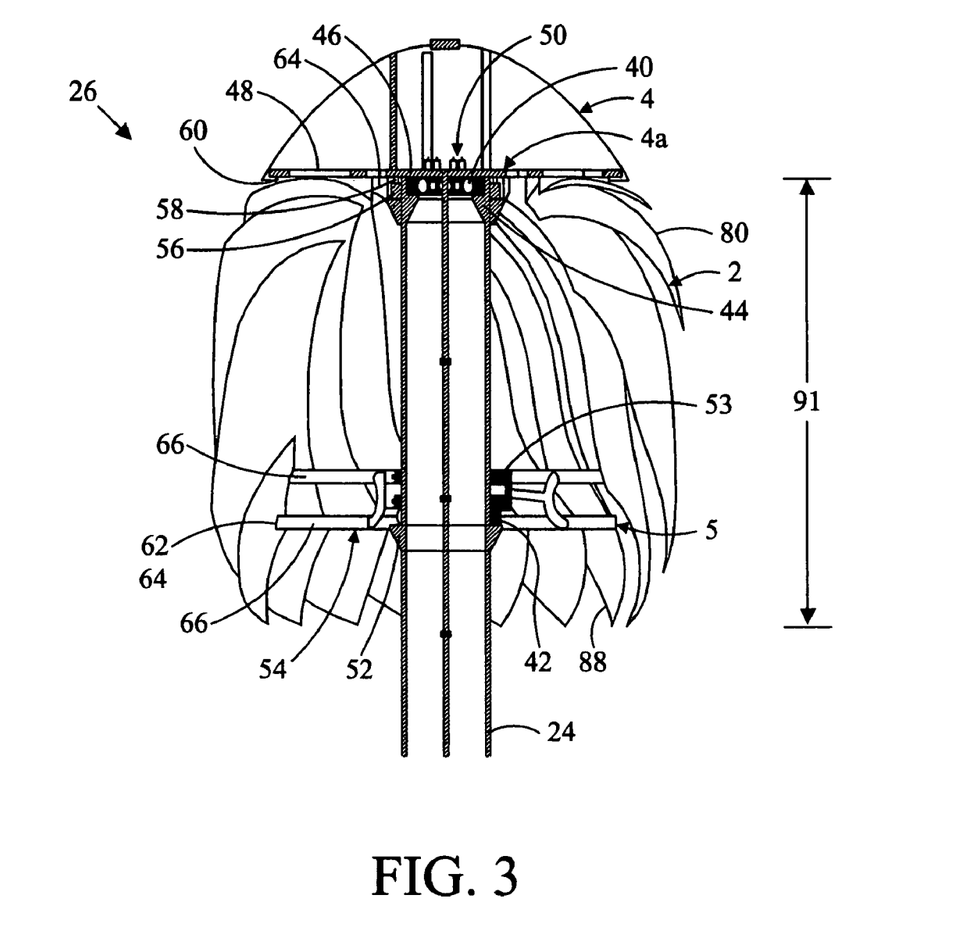
FIG. 3 is a sectional view of an elevation of the inventive wind turbine.
Figure 4:
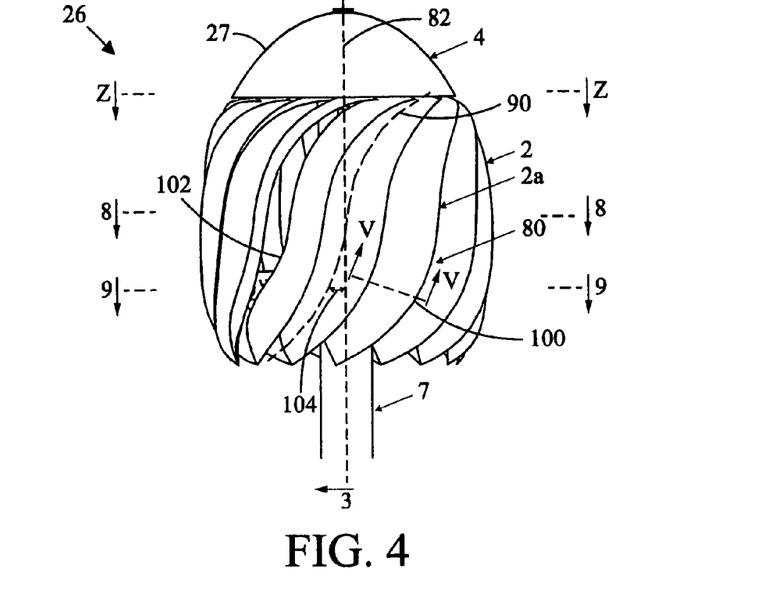
FIG. 4 is an elevation view of a wind turbine.

The tower 24 is typically cylindrical and may be constructed of any convenient material providing the necessary strength, rigidity, and other desired properties. For example, the tower 24 may comprise multiple pre-cast, tubular, reinforced concrete units with internal post tensioned cables, if necessary, for tower stabilization. The tower 24 is attached to the foundation 22 which may surface mounted or completely or partially buried, as determined by the installation's siting limitations. Referring to FIG. 3, the turbine 26 is rotatably supported at the top of the tower 24 by upper 40 and lower 42 bearings. The upper bearing 40 bears on an upper bearing support 44 attached to the tower 24 and on a hub 46 at the center of an upper vane support 48. The hub 46 of the upper vane support 48 is bolted 50 to a flange on the end of the main drive shaft 36 so that the main drive shaft will rotate with the upper vane support. At its lower end, the turbine 26 is rotationally supported by the lower bearing 42 that bears against a lower bearing support 52 attached to the tower 24 and a hub 53 of a lower vane support 54.

The shells of a plurality of hydraulic rams 56 are attached to the tower 24. The movable piston rods 58 of the rams can be extended to bear against the hub 46 of the upper vane support 48. When replacing the upper 40 and lower 42 bearings, the turbine 26 can be raised to facilitate bearing removal by extending the piston rods 58 of the appropriate hydraulic rams 56.

Figure 5:
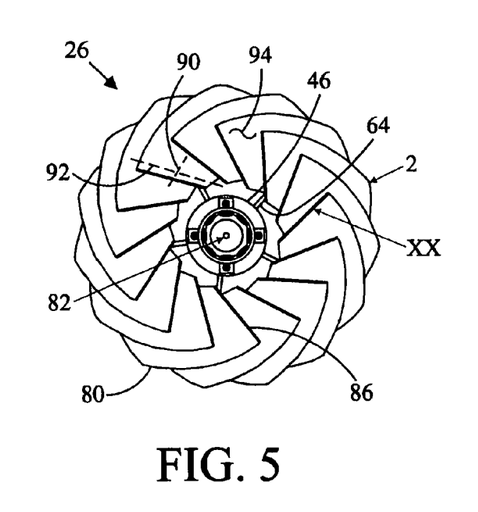
FIG. 5 is a section view of the wind turbine of FIG. 4 along line Z—Z of FIG. 4.
Figure 6:
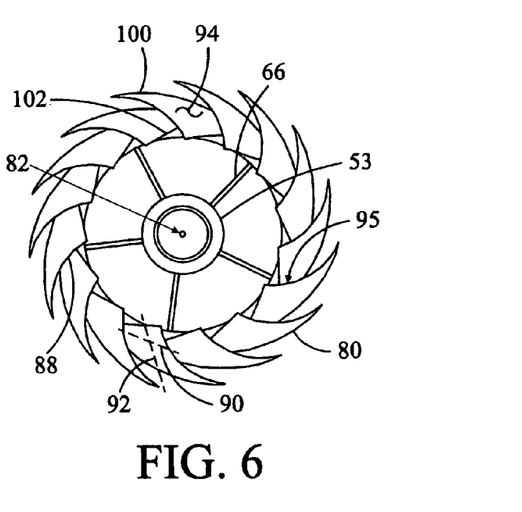
FIG. 6 is a bottom view of the wind turbine of FIG. 4.

The wind turbine 26 typically comprises 5–15 vanes 80 attached to vane attachment rings 60, 62 supported by spokes 64, 66 radiating from the central hubs 46, 53 of the upper 48 and lower 54 vane supports, respectively. Referring to FIGS. 5 and 6, when viewed in the direction of the rotational axis 82 of the turbine 26, the vanes 80 form an annular envelope with an open center. The shape of the exterior envelope of the turbine 26 is typically that of a prolate spheroid. The height 91 (indicated by a bracket) of the wind turbine 26 is typically less than 50% of the height of the tower 24 to limit the forces acting on the tower and the resultant stress in the tower components. Turbines having a diameter to height ratio between 0.45 and 0.90, and, preferably, between 0.60 and 0.80 provide a desirable balance of speed and torque, producing ample power and limiting stress on the turbine components.

Figure 7:
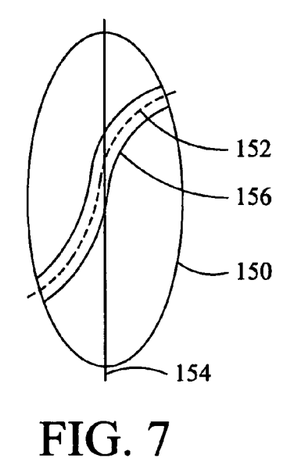
FIG. 7 is a schematic illustration of a method of generating the shape of a vane of the wind turbine.

The vanes 80 of the wind turbine 26 comprise a surface 94 bounded by a leading edge 100, a trailing edge 102, a upper end 86, and a second end 88. A line connecting and approximately bisecting the upper end 86 and the lower end 88 defines a substantially longitudinal axis 90 of the vane 80. A line extending transverse to the longitudinal axis defines a substantially lateral, chord axis 96 of the vane 80. Referring to FIG. 7, the shape of the surface 94 of the vane 90 substantially corresponds to a portion of the surface of a prolate spheroid 150 that would be overlaid if a planar blank 156 of the vane was aligned with its longitudinal axis 152 skewed relative to the polar axis 154 of the spheroid and then wrapped over the surface of the spheroid. Typically, the longitudinal axis 152 of the blank is skewed between 30° and 60° to the polar axis of the spheroid for the purpose of generating the surface but other lesser or greater angles of skew can be used. The leading 100 and trailing 102 edges of the vane 80 are elongated S-curves extending between the upper 86 and lower 88 ends of the vane. The elongated S-curves result from overlaying the blank 156 of the vane, having edges spatially corresponding to the leading 100 and trailing 102 edges of the vane and defined by sine waves having neutral axes substantially parallel to the longitudinal axis of the vane,on the surface of the spheroid 150.

Figure 8:
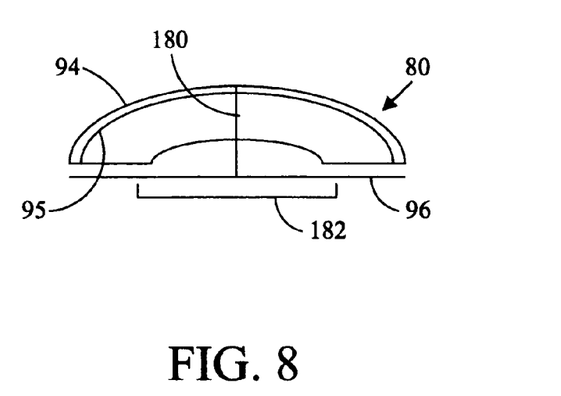
FIG. 8 is a section view of a vane of the wind turbine along line v—v of FIG. 4.

Referring to FIG. 8, when viewed in the direction of the longitudinal axis 90, the surface 94 of the vane 80 has an elliptical profile. The shape of the ellipse is determined by the lengths of a minor axis 180 extending perpendicular to the surface 94 and a major axis 182 (indicated by a bracket) extending in the direction of the chord axis 96 of the vane 80. The minor axis 180 varies in length from the upper end of the vane to the lower end of the vane so that the elliptical profile of the surface 94 takes the form of a truncated, conical ellipse. When viewed in the direction of the longitudinal axis 90, the vane 80 is substantially planar at its upper end 86, as illustrated in FIG. 5, and substantially curved at its lower end 88, as illustrated in FIG. 6. Air flowing over the curved surface 94 of the vane 80 generates a lift force to rotate the turbine and the cupped profile of the reverse surface 95 of the vane enhances turbine start-up by catching the wind.

Referring to FIG. 3, when attached to the upper 48 and lower 49 vane supports, a vane 80 is positioned such that the longitudinal axis 90 of a first length of the vane, approximately midway between the upper 86 and lower 88 ends, is skewed at a first angle 104 to the rotational axis 82 of the wind turbine 26. The first angle 104 is greater than 15° and less than 90° and typically, in the range of 22°–44° to the rotational axis of the wind turbine. Skewing the longitudinal axis 90 of the vane 80 relative to the rotational axis 82 of the turbine 26 increases the chord line of the airfoil as defined by Bernoulli's Law and increases the ram pressure exerted on the vane by the wind to increase the lift force and reduce drag forces. The elongated S-curve of the leading 100 and trailing 102 edges causes the portions of the longitudinal axis extending through a second length and a third length proximate the upper 86 and lower 88 ends of the vane 80 to be substantially parallel to each other and skewed at an angle to the rotational axis of the turbine that is greater than the first angle, reducing the effects of vortices at the tips of the blades and improving the ability of the vane to catch the wind during startup.

The vanes 80 are mounted with the leading edge 100 of each vane projecting radially outward of the trailing edge 102 of the adjacent vane. The shape and arrangement of vanes maximize surface exposure and lift coefficient and minimize wind shading effects produced by the preceding vane. In addition, the air flow through the turbine 26 raises the air pressure in the interior of the annular turbine. The higher pressure in the center of the turbine produces thrust on the wind wane side of the vanes 80 for additional turbine speed and torque. Wind flowing horizontally from any direction at any speed, or wind shear flowing parallel to the axis of rotation 82 of the turbine 26 will create a force to rotate the turbine.

A cap 27, attached to the upper vane mounting 48, covers the exposed upper ends 86 of the vanes 80. The cap 27 reduces turbulence in the air flow and stabilizes the turbine.

While the tower 24 elevates the turbine 26 to take advantage of the higher velocity, less turbulent wind above the earth's surface, the structural requirements and cost of the tower are less than that required for a typical horizontal axis turbine. The tower is not required to support the weight of the generator and mechanical power transmission equipment. Further, tower oscillation and fatigue caused by the pressure wave produced by the interaction of the tower and the blades of a horizontal axis turbine and the pitch and yaw forces generated by the rotor are substantially reduced or eliminated, reducing structural requirements and improving tower stability. There is no appreciable wind shading interaction between the centrally located tower 24 and the turbine 26.

Rotation of the turbine 26 is transferred to the generator 28 through the main drive shaft 36 connecting the hub 46 of the upper vane support and a clutch 33 at the input to the right-angle drive 32. A variable mass flywheel 34 is also attached to the input to the right-angle drive 32 to modulate speed fluctuations produced by gusting winds and prolong the output of the generator 28 when the wind dies down. The variable mass flywheel 34 comprises a hollow ring torus 120 connected to a radially centered hub 124 by a plurality of tubular spokes 122. The hollow toroidal tube 120 is elevated relative to the hub 124 so that a fluid, such as water, in the torus 120 will flow toward the hub, through the tubular spokes 122, when the flywheel is stationary or turning slowly. On the other hand, when flywheel 34 is rotating, centrifugal force causes fluid pumped into the hub 124 by a pump 128 and controlled by the fluid control 130, to flow outward through the spokes 122 to the toroidal tube 120. Baffles internal to the torus 120 cause the fluid to rotate with the flywheel 34. Adding fluid to the flywheel 34 increases the mass and inertia of the flywheel increasing the amount of energy that can be stored by the flywheel and enabling the flywheel to absorb greater speed fluctuations. Draining fluid from the flywheel 34 reduces the mass and inertia of the flywheel to ease turbine start-up.

Figure 9:
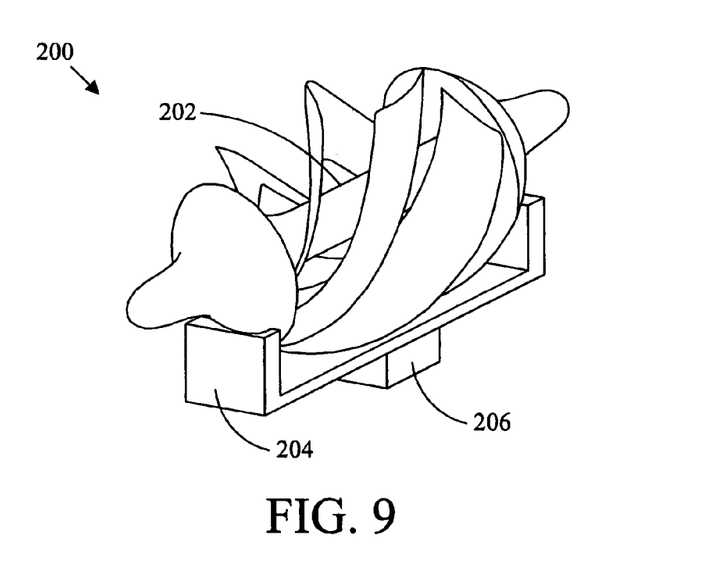
FIG. 9 is a perspective view of a horizontal axis embodiment of the inventive wind turbine.

Referring to FIG. 9, the innovative turbine can also be constructed as a horizontal axis wind turbine 200. The horizontally extending central shaft 202 is supported in a yoke 204 that is rotatable on a base 206 to facilitate yaw to align the shaft parallel to the wind flow. The turbine is responsive to wind flow substantially parallel to the shaft, either wind shear in a vertical axis configuration or wind flow parallel to the earth's surface in a horizontal configuration 200. A horizontal axis is desirable when the overall height of the turbine is limited, for example, when the turbine is used to power a ship.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A wind turbine vane including:
   a) a first end;
   b) a second end spaced apart from said first end; and
   c) a leading edge connecting said first end and said second end and substantially conformed to a surface of a spheroid having a polar axis, said leading edge approximating a sine wave having a neutral axis substantially parallel to a longitudinal axis of said vane, said longitudinal axis approximately bisecting a chord of said first end and a chord of said second end and skewed relative to said polar axis such that a projection of said longitudinal axis beyond said first end does not intersect said polar axis.

2. The wind turbine vane of claim 1 further comprising a trailing edge connecting said first end and said second end and spaced apart from said leading edge, said trailing edge approximating a shape of a sine wave having a neutral axis substantially parallel to said longitudinal axis of said vane and substantially conformed to a surface of said spheroid.

3. The wind turbine vane of claim 1 wherein said vane further comprises a surface approximating an ellipse, said ellipse being defined by a major axis arranged substantially parallel to a chord axis of said vane and a minor axis arranged substantially normal to said major axis and said surface.

4. The wind turbine vane of claim 3 wherein a length of said minor axis defining said ellipse is greater proximate said first end of said vane than said length of said minor axis proximate said second end of said vane.

5. A wind turbine comprising:
   a) a vane support arranged for rotation about an axis of rotation; and
   b) a vane attached to said vane support, said vane including:
      i) a first end;
      ii) a second end spaced apart from said first end; and
      iii) a leading edge connecting said first end and said second end and substantially conformed to a surface of a spheroid having a polar axis, said leading edge approximating a sine wave having a neutral axis substantially parallel to a longitudinal axis of said vane, said longitudinal axis approximately bisecting a chord of said first end and a chord of said second end and skewed relative to said polar axis such that a projection of said longitudinal axis beyond said first end does not intersect said polar axis.

6. The wind turbine of claim 5 wherein said vane is attached to said vane support proximate said first end of said vane and proximate said second end of said vane, said first and said second ends being arranged such that said longitudinal axis of said vane is skewed relative to the axis of rotation of said vane support and a projection of said longitudinal axis of said vane beyond said first end does not intersect said axis of rotation of said vane support.

7. The wind turbine of claim 6 wherein a portion of said longitudinal axis of said vane proximate midway between said first end and said second end is skewed relative to said axis of rotation of said turbine at an angle, said angle being greater than fifteen degrees and less than ninety degrees.

8. The wind turbine of claim 5 wherein said axis of rotation is substantially vertical.

9. The wind turbine of claim 5 wherein said axis of rotation is substantially horizontal.

10. The wind turbine of claim 5 wherein said vane surface further approximates an ellipse, said ellipse being defined by a major axis arranged substantially transverse to said longitudinal axis of said vane and a minor axis arranged substantially normal to said major axis and said longitudinal axis.

11. The wind turbine of claim 5 further comprising a trailing edge connecting said first end and said second end of said vane and spaced apart from said leading edge of said vane, said trailing edge approximating a shape of a sine wave having a neutral axis substantially parallel to said longitudinal axis of said vane and substantially conformed to said surface of said prolate spheroid.

12. The wind turbine of claim 11 wherein said vane is attached to said vane support proximate said first end of said vane and proximate said second end of said vane, said first and said second ends being arranged such that said longitudinal axis of said vane is skewed relative to said axis of rotation.

13. The wind turbine of claim 12 wherein a portion of said longitudinal axis of said vane proximate midway between said first end and said second end is skewed relative to said axis of rotation of said turbine at an angle, said angle being greater than fifteen degrees and less than ninety degrees.

14. The wind turbine of claim 11 wherein said axis of rotation is substantially vertical.

15. The wind turbine of claim 11 wherein said axis of rotation is substantially horizontal.

16. The wind turbine of claim 11 wherein said vane surface further approximates an ellipse, said ellipse being defined by a major axis arranged substantially a chord of said vane and a minor axis arranged substantially normal to said major axis and said longitudinal axis.

17. The wind turbine of claim 16 wherein a length of said minor axis of said elliptical surface is greater proximate said first end of said vane than said length of said minor axis proximate said second end.

18. The wind turbine of claim 17 wherein said axis of rotation is substantially vertical.

19. The wind turbine of claim 17 wherein said axis of rotation is substantially horizontal.

20. The wind turbine of claim 17 wherein said vane is attached to said vane support proximate said first end of said vane and proximate said second end of said vane, said first and said second ends being arranged such that said longitudinal axis of said vane is skewed relative to said axis of rotation of said vane support.

21. The wind turbine of claim 17 further comprising another vane attached to said vane support, said another vane including another leading edge and another trailing edge, said leading edge of said vane being positioned radially further from said axis of rotation of said vane support than said another trailing edge.

22. The wind turbine of claim 21 further comprising a cap covering one of said first and said second ends of said vane and an end said another vane.

23. A wind powered energy converter comprising:
a) a foundation;
b) a substantially vertical tower having a first end supported by said foundation and a second end;
c) a wind turbine rotationally mounted on said tower proximate said second end;
d) a power transmission apparatus having a first connection to said wind turbine and a second connection;
e) a flywheel rotatable by said second connection of said power transmission apparatus, a mass of said flywheel variable by altering a quantity of matter comprising said flywheel; and
f) an energy converter attached to said flywheel to convert the rotational energy of said flywheel to another form of energy.

24. The wind powered energy converter of claim 23 wherein said flywheel comprises:
a) a hollow torus arranged for rotation about a radial center;
b) a fluid, and
c) a fluid control to selectively control a flow of fluid between a source external to said flywheel and said torus.

25. The wind powered energy converter of claim 23 wherein said wind turbine comprises:
a) a vane support supported by said tower for rotation about an axis of rotation;
b) a first vane attached to said vane support, said first vane including:
i) a first end;
ii) a second end spaced apart from said first end, an approximate bisector of a chord of said first and said second ends defining a longitudinal axis of said vane;
iii) a leading edge connecting said first end and said second end, said leading edge approximating a sine wave having a neutral axis substantially parallel to said longitudinal axis of said vane and conformed to a surface of a spheroid, said spheroid having a polar axis skewed relative to and not intersecting a projection of said longitudinal axis of said vane beyond said first end; and
iv) a trailing edge connecting said first end and said second end and spaced apart from said leading edge, said trailing edge approximating a shape of a sine wave having a neutral axis substantially parallel to said longitudinal axis of said vane and conformed to said surface of said spheroid; and
c) another vane attached to said vane support, said another vane including another leading edge and another trailing edge, said leading edge of said first vane being positioned radially further from said axis of rotation than said another trailing edge.

26. The wind powered energy converter of claim 25 wherein said vane surface of said first vane further approximates an ellipse, said ellipse being defined by a major axis arranged substantially parallel to a chord axis of said vane and a minor axis arranged substantially normal to said major axis and said surface.

* * * * *

UNITED STATES PATENT AND TRADEMARK OFFICE
CERTIFICATE OF CORRECTION

PATENT NO. : 7,040,859 B2
APPLICATION NO. : 10/772022
DATED : May 9, 2006
INVENTOR(S) : Vic Kane It is certified that error appears in the above-identified patent and that said Letters Patent is hereby corrected as shown below:

Column 1
Line 27, delete the word "be" between must and resist.

Column 3
Line 46, add the word "be" between may and surface.

Column 4
Line 22, delete "90" following the word "vane."

Column 4
Line 38, insert a space after the comma following the word "vane."

Column 7
Line 50, add the words --parallel to-- after the word "substantially."

Signed and Sealed this

Fourteenth Day of November, 2006

JON W. DUDAS
*Director of the United States Patent and Trademark Office*